(12) United States Patent
Toyoshima (10) Patent No.: US 8,145,040 B2
(45) Date of Patent: Mar. 27, 2012

(54) PROGRAM RECORDING SYSTEM, COMMUNICATION TERMINAL, AS WELL AS RECORDING AND REPRODUCING APPARATUS

(75) Inventor: Akihiko Toyoshima, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 295 days.

(21) Appl. No.: 11/079,812

(22) Filed: Mar. 14, 2005

(65) Prior Publication Data

US 2005/0201720 A1  Sep. 15, 2005

(30) Foreign Application Priority Data

Mar. 15, 2004  (JP) ................... P2004-073067

(51) Int. Cl.
*H04N 5/76* (2006.01)
(52) U.S. Cl. .................................................. 386/291
(58) Field of Classification Search ............. 386/1, 37, 386/46, 52; 725/37, 50–52, 86, 105, 135
See application file for complete search history.

(56) References Cited

U.S. PATENT DOCUMENTS

| | | | | |
|---|---|---|---|---|
| 4,916,532 A | * | 4/1990 | Streck et al. ................... | 348/723 |
| 5,420,647 A | * | 5/1995 | Levine ........................... | 348/734 |
| 5,729,280 A | * | 3/1998 | Inoue et al. .................... | 725/101 |
| 6,199,206 B1 | * | 3/2001 | Nishioka et al. ................ | 725/51 |
| 6,233,734 B1 | * | 5/2001 | Macrae et al. .................. | 725/50 |
| 6,591,421 B1 | * | 7/2003 | Sullivan ......................... | 725/50 |
| 6,801,713 B1 | * | 10/2004 | Yagawa et al. ................. | 386/69 |
| 2002/0049978 A1 | * | 4/2002 | Rodriguez et al. ............. | 725/86 |
| 2002/0100047 A1 | * | 7/2002 | Matoba et al. .................. | 725/46 |
| 2005/0197059 A1 | * | 9/2005 | Numakami et al. ......... | 455/3.02 |
| 2005/0251828 A1 | * | 11/2005 | Young et al. .................... | 725/52 |

FOREIGN PATENT DOCUMENTS

| | | |
|---|---|---|
| JP | 1-68686 | 3/1999 |
| JP | 2001-168742 | 6/2001 |
| JP | 2002-57645 | 2/2002 |
| JP | 2002-244955 | 8/2002 |
| JP | 2003-110955 | 4/2003 |
| JP | 2004-48521 | 2/2004 |

OTHER PUBLICATIONS

English translation of Korean preliminary rejection of Apr. 18, 2011 in corresponding Korean application No. 10-2005-20874.

* cited by examiner

*Primary Examiner* — William C Vaughn, Jr.
*Assistant Examiner* — Eileen Adams
(74) *Attorney, Agent, or Firm* — Frommer Lawrence & Haug LLP; William S. Frommer; Thomas F. Presson (57) ABSTRACT

According to the present invention, a recording instruction signal including channel information on the program that the user is viewing at present is transmitted from a communication terminal with a television receiving function; this recording instruction signal is received by a recording and reproducing apparatus; and the recording processing of the program indicated by the received recording instruction signal to be recorded is controlled, so that the program viewed using a communication terminal away from home can be viewed using a recording and reproducing apparatus at home.

17 Claims, 6 Drawing Sheets

Table of Titles — Recording Title Menu

| | | | |
|---|---|---|---|
| Feb. 26 (Turs.) | Animation | From the beginning of Program | From the Viewing Start Time | From Immediately after the Viewing Suspended |
| Feb. 29 (Sun.) | Soccer | From the beginning of Program | From the Viewing Start Time | From Immediately after the Viewing Suspended |
| Mar. 3 (Wed.) | Professional Baseball | — | From the Viewing Start Time | From Immediately after the Viewing Suspended |
| Mar. 11 (Turs.) | Drama | From the beginning of Program | — | From Immediately after the Viewing Suspended |
| | .... | | | |

PROGRAM RECORDING SYSTEM, COMMUNICATION TERMINAL, AS WELL AS RECORDING AND REPRODUCING APPARATUS

BACKGROUND OF THE INVENTION

1. Field of the Invention

The present invention relates to a program recording system suitable for instructing from remote places such as a place away from home a recording and reproducing apparatus at home to record desired programs, using, for example, a communication terminal such as a mobile phone unit provided with a function of receiving a program of television broadcast (hereinafter, also called television) and the like, and relates to a communication terminal and a recording and reproducing apparatus which are used in the system.

2. Description of the Related Art

Recently, a communication terminal such as a mobile phone unit integrally provided with a portable television broadcast receiver (hereinafter called a television receiver) capable of receiving ground-based analogue television broadcast has been in practical use, and with the start of mobile broadcast and ground-based digital television broadcast, the life style in which television programs can be viewed and listened to anywhere and anytime has further become popular as a general trend.

On the other hand, a television program recording apparatus has been proposed, in which recording reservation of one or more programs can automatically be carried out by a user being at a remote place using a mobile phone unit to transmit one or more program discriminating data to a recording apparatus at home, when a television program to be recorded is known in advance (refer to Patent document 1, for example). According to this television program recording apparatus, the recording reservation of television programs can be performed from the remote place, which is very convenient.

Patent document 1: Japanese Published Patent Application No. 2001-285768

However, the technology described in the patent document 1 is the one which performs recording reservation of a program that is decided to record in advance, so that the technology can not cope with the case where a user desires to record the program being viewed at present using the above mobile phone unit provided with a function of receiving television broadcast. Further, the technology may cope with the above case, when connecting a separate video recording apparatus to the above mobile phone unit capable of receiving television broadcast, when preparing a memory device of large capacity, or when carrying a recording apparatus and a memory device together; however, a recording apparatus must be connected every time and a recording apparatus and a memory device are required to be always carried with a user, which is not user-friendly and increases the cost.

Therefore, a user who desires, after getting home, to again view the program that was viewed using a mobile phone unit with a television receiving function has not been satisfied with simple and inexpensive means. Further, there is nothing to meet the request of a user having viewed a program only halfway, who desires to view the program from the beginning or to view the remainder thereof at home.

SUMMARY OF THE INVENTION

In view of the above described problems, the present invention aims to meet in a simplified and inexpensive manner the request by a user of viewing again the program which has been viewed away from home after getting home, for example.

A program recording system of the present invention includes: a communication terminal that has a television receiving unit which receives a television broadcast program, an audio and visual unit for viewing and listening to the television program received by the television receiving unit, a first controller which generates a recording instruction signal including at least channel information on the television program to give an instruction to record the television program, and a transmitting unit which transmits the recording instruction signal from the first controller; and a recording and reproducing apparatus that has a receiving unit which receives the recording instruction signal transmitted from the communication terminal, a recording and reproducing unit which records and reproduces a television broadcast program, and a second controller which controls the start of the recording operation of the recording and reproducing unit in accordance with the recording instruction signal received by the receiving unit.

A communication terminal of the present invention includes: a television receiving unit which receives a television broadcast program, an audio and visual unit for viewing and listening to the television program received by the television receiving unit, a first controller which generates a recording instruction signal at least including channel information on the television program to give an instruction to record the television program, and a transmitting unit which transmits the recording instruction signal from the first controller.

A recording and reproducing apparatus of the present invention includes: a receiving unit which receives the recording instruction signal including at least channel information on the television program to give an instruction to record the television program, a recording and reproducing unit which records and reproduces the television program, and a second controller which controls the start of the recording operation of the recording and reproducing unit in accordance with the recording instruction signal received by the receiving unit.

According to the present invention, since a recording instruction signal including channel information of the program that the user is at present viewing and listening to is transmitted from a communication terminal provided with a television receiving function and this recording instruction signal is received by a recording and reproducing apparatus to control recording processing of the program indicated to be recorded by the recording instruction signal, the program viewed using the communication terminal away from home can be viewed using the recording and reproducing apparatus at home.

DETAILED DESCRIPTION OF THE PREFERRED EMBODIMENT

Figure 1:
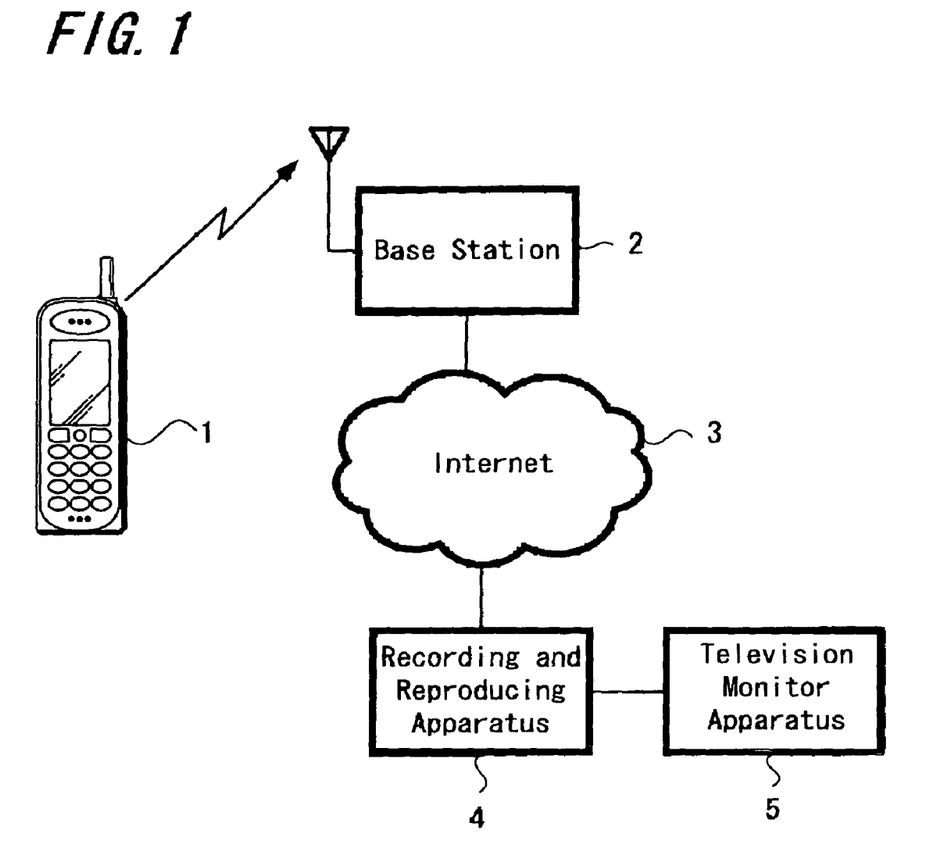
FIG. 1 is a block diagram schematically showing an example of the system configuration according to an embodiment of the present invention.

FIG. 1 is a block diagram schematically showing an example of a program recording system according to an embodiment of the present invention. In FIG. 1, a mobile phone unit 1 is provided with a receiver for television broadcast (hereinafter also called television). A base station 2 in a mobile telephone system is conventionally connected to a mobile telephone network (not shown) and telephone calls can be performed with the other mobile phone units or with a fixed line telephone (not shown); however, hereupon a detailed explanation regarding the telephone calls is omitted.

The base station 2 is also connected to the public packet data network (public network) such as the Internet 3 and the mobile phone unit 1 can exchange packet data with the other mobile phone units or a server on the Web (World Wide Web) and the like (not shown).

Further, the mobile phone unit 1 can exchange packet data with a recording and reproducing apparatus 4 located at home through the Internet by registering in advance an IP (Internet Protocol) address of the recording and reproducing apparatus 4 in the mobile phone unit 1. This recording and reproducing apparatus 4 is connected to an antenna that can receive television broadcast or to a cable television network and the like (not shown), and a television program can be recorded. A user can view the recorded program using a television monitor apparatus 5 connected to the recording and reproducing apparatus 4.

Figure 2:
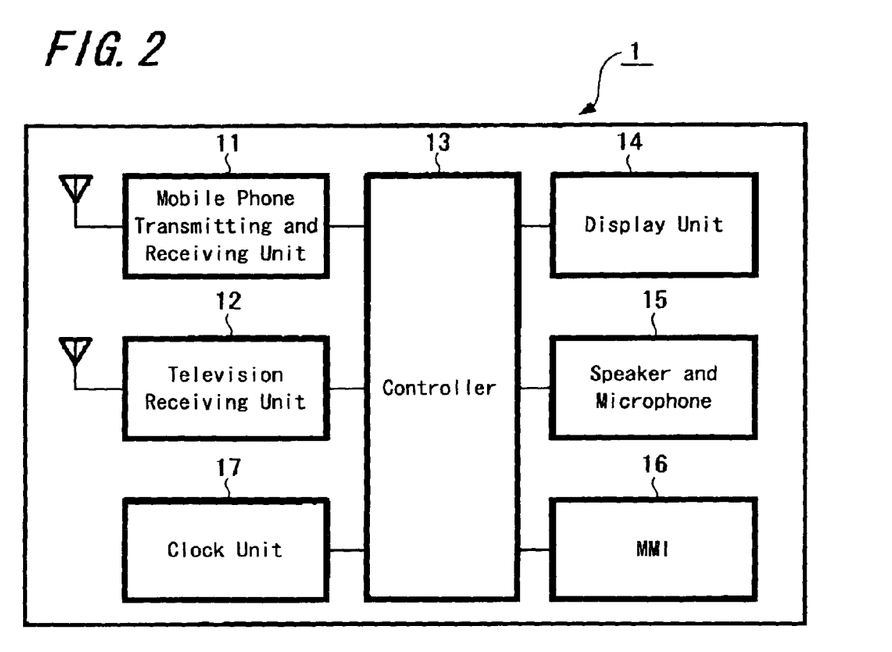
FIG. 2 is a schematic constitutional diagram showing an example of a mobile phone unit according to an embodiment of the present invention.

FIG. 2 is a diagram schematically showing an example of the configuration of the mobile phone unit 1 shown in FIG. 1. In FIG. 2, a mobile phone transmitting and receiving unit 11 performs communication of the audio data and the packet data; a television receiving unit 12 receives a television broadcast signal; and a controller 13 including a processor and the like performs predetermined processing using a RAM (Random Access Memory) not shown as the work area in accordance with a program recorded in a nonvolatile ROM (Read Only Memory) and the like to control the whole of the mobile phone unit 1.

Further, a display unit 14 is for example a liquid crystal display device and a speaker and microphone 15 emits the audio data to the outside and picks up the sound from the outside (hereinafter called a microphone). In FIG. 2, a speaker of the speaker and microphone 15 is also used when viewing and listening to a television program, or though it is not shown, an earphone speaker output terminal or the like is provided and an earphone microphone connected to this earphone speaker output terminal may be worn directly on an ear of the user. Further, a man machine interface (hereinafter called MMI) 16 converts an operational instruction from a user into an electric signal to be input to the controller 13, and a clock unit 17 has time information to be used as an element of information that decides the various kinds of operations in the controller 13.

In the mobile phone unit 1 of FIG. 2, the operational instruction from the user is input to the controller 13 through the MMI 16, and the controller 13 provides the user with services such as audio data communication, packet data communication and the like in accordance with the operational instruction.

Further, the mobile phone unit 1 can display contents of a television program on the display unit 14 under the control of the controller 13 at a place where the television program can be received. At this time, the user can select the desired television channel by means of the MMI 16 and the display unit 14.

Figure 3:
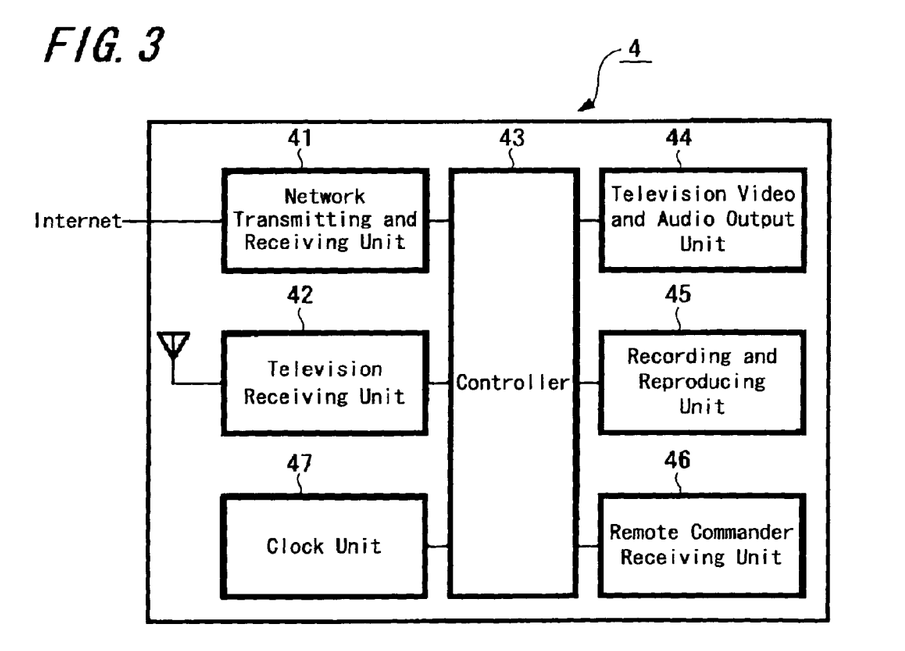
FIG. 3 is a schematic constitutional diagram showing an example of a recording and reproducing apparatus according to an embodiment of the present invention.

FIG. 3 is a diagram schematically showing an example of the configuration of the recording and reproducing apparatus 4 shown in FIG. 1. A network transmitting and receiving unit 41 is connected to a public network such as the Internet and packet data and the like are transmitted to and received from the outside. A television receiving unit 42 receives a television broadcast signal. A controller 43 includes a processor and the like and performs predetermined processing using a RAM (Random Access Memory) not shown as the work area in accordance with a program recorded in a nonvolatile ROM (Read Only Memory) and the like to control the whole of the recording and reproducing apparatus 4.

Further, a television video and audio output unit 44 outputs the television video and audio data sent from the controller 43 to the television monitor apparatus 5 (refer to FIG. 1) connected to the recording and reproducing apparatus 4, and a recording and reproducing unit 45 performs the recording processing of the television program received by the television receiving unit 42. Various kinds of devices such as a video tape device, a recordable DVD (Digital Versatile Disk) drive unit or a hard disk drive unit can be applicable to the recording and reproducing unit 45. Further, the television program recorded in the recording and reproducing unit 45 is reproduced under the control of the controller 43 and is supplied to the television monitor apparatus 5 through the television video and audio output unit 44 to be viewed after time-shift.

Conventionally, a recording instruction command by the operation of a user is transmitted through a remote commander not shown in the figure in accordance with the standard of, for example, IrDA (Infrared Data Association) and the like to be received by a remote commander receiving unit 46, and accordingly the instructions of the above described recording operation and reproducing operation are performed. A clock unit 47 has time information, and with respect to the recording operation and the recording reservation operation, the controller 43 performs the control over the recording end instruction and over the recording reservation and the like based on the time information obtained from the clock unit 47 and the information on time reserved for recording.

Further, the recording and reproducing apparatus 4 can be operated by the mobile phone unit 1 or the like from a remote place through a public network such as the Internet and the like. Furthermore, the recording and reproducing apparatus 4 can acquire information on a specific electronic program guide (EPG) via the network or from a television broadcast wave and the like. The end time of broadcasting of the program to which the user gives an instruction to record from the mobile phone unit 1 is obtained from the electronic program guide (hereinafter called EPG data), and the program recording operation can automatically be ended when judged that the end time of the broadcasting has been reached based on the time information obtained from the clock unit 47.

Next, the operation according to the embodiment shown in FIGS. 1 to 3 is explained.

Figure 4:
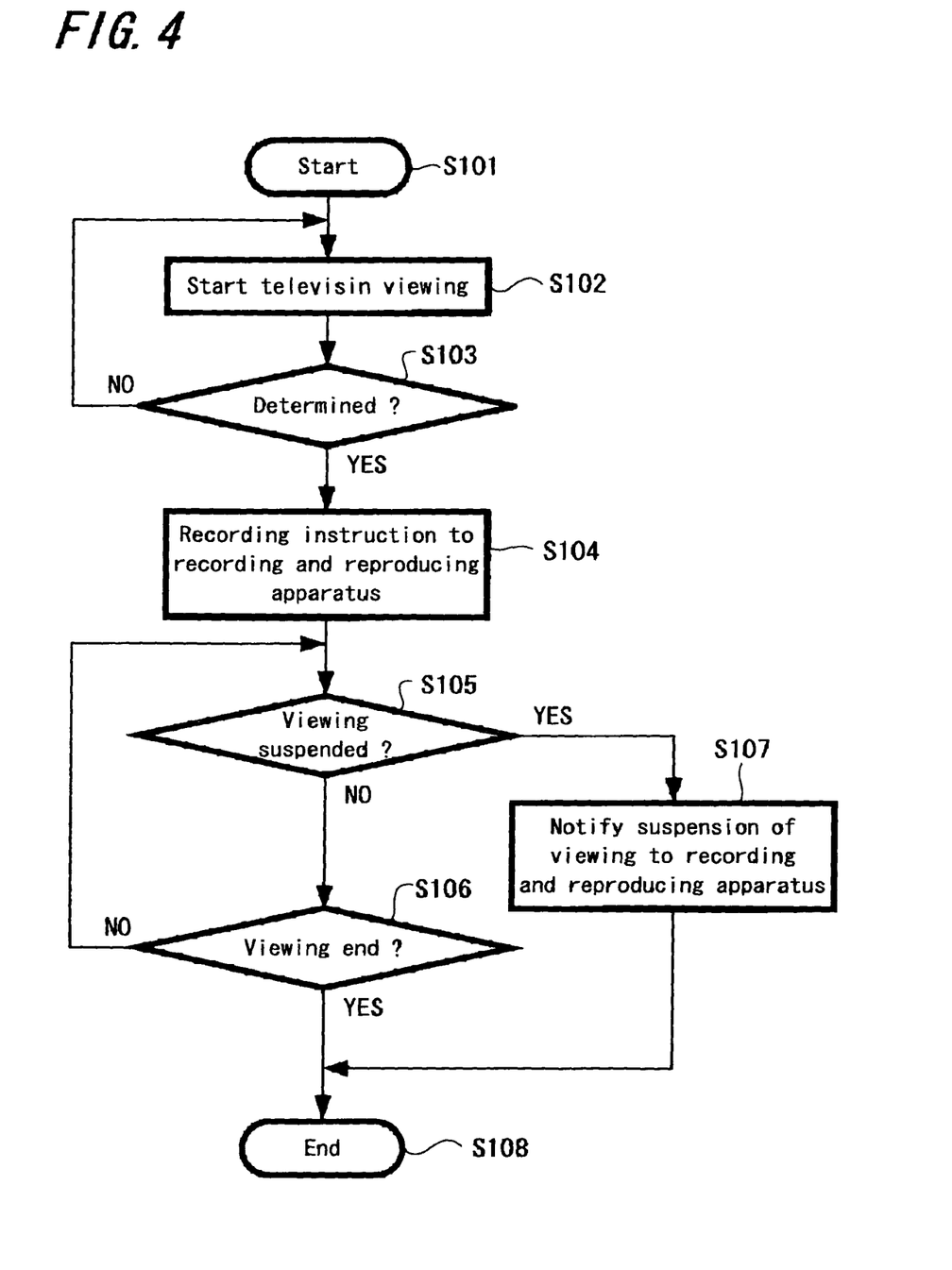
FIG. 4 is a flowchart showing the operation of a mobile phone unit according to an embodiment of the present invention.

FIG. 4 is a flowchart showing the operation of a mobile phone unit. A user operates the mobile phone unit 1 and starts viewing operation of a television program (step S101) and first starts viewing the television program (step S102). The controller 13 of the mobile phone unit 1 judges whether the program that the user views has been determined or not (step S103), and if it has not been determined, the operation goes back to the processing of step S102.

In the judgment step S103, when judging the program to be viewed by the user has been determined and after judging whether the instruction of recording the program under viewing is given or not, the controller 13 of the mobile phone unit 1 issues a recording instruction command to the recording and reproducing apparatus 4. For example, based on time information from the clock unit 17 provided with the mobile phone unit 1, the recording instruction may automatically be issued after viewing the same program for a certain period of time, for example, one minute, or an inquiry comment is displayed on the display unit 14 when starting the viewing and whether the program being viewed is recorded or not is to be judged, and then the recording instruction may be issued depending on the reply of the user.

Then, packet data including the recording instruction command and the channel information on the program under viewing is transmitted as program viewing information from the mobile phone transmitting and receiving unit 11 of the mobile phone unit 1 to the recording and reproducing apparatus 4 that is connected to the Internet 3 and is capable of communicating with each other, so that the recording instruction on real-time processing of the television program under viewing can be issued from the mobile phone unit 1 by the remote control away from home (step S104).

After that, the viewing condition of the mobile phone unit 1 is monitored and whether viewing the program is suspended or not is judged (step S105). When the user can not view the program to the last due to some reasons, for example, when the user stops the action of viewing with the mobile phone unit 1 or when the program being viewed by the user is changed to another program, the recording instruction command is issued to notify the recording and reproducing apparatus 4 of suspension of the viewing (condition 107), and the viewing processing is ended (step S108).

In the above described judgment step S105, when the viewing was not stopped, it is judged whether the program has been viewed to the end (step S106), and when the program has been viewed to the end thereof, the operation proceeds to step S108 and a series of processing is ended. When the program has not yet been viewed to the end thereof, the operation goes back to the judgment step S105 and monitoring of whether the viewing is suspended in the middle of the program continues.

Figure 5:
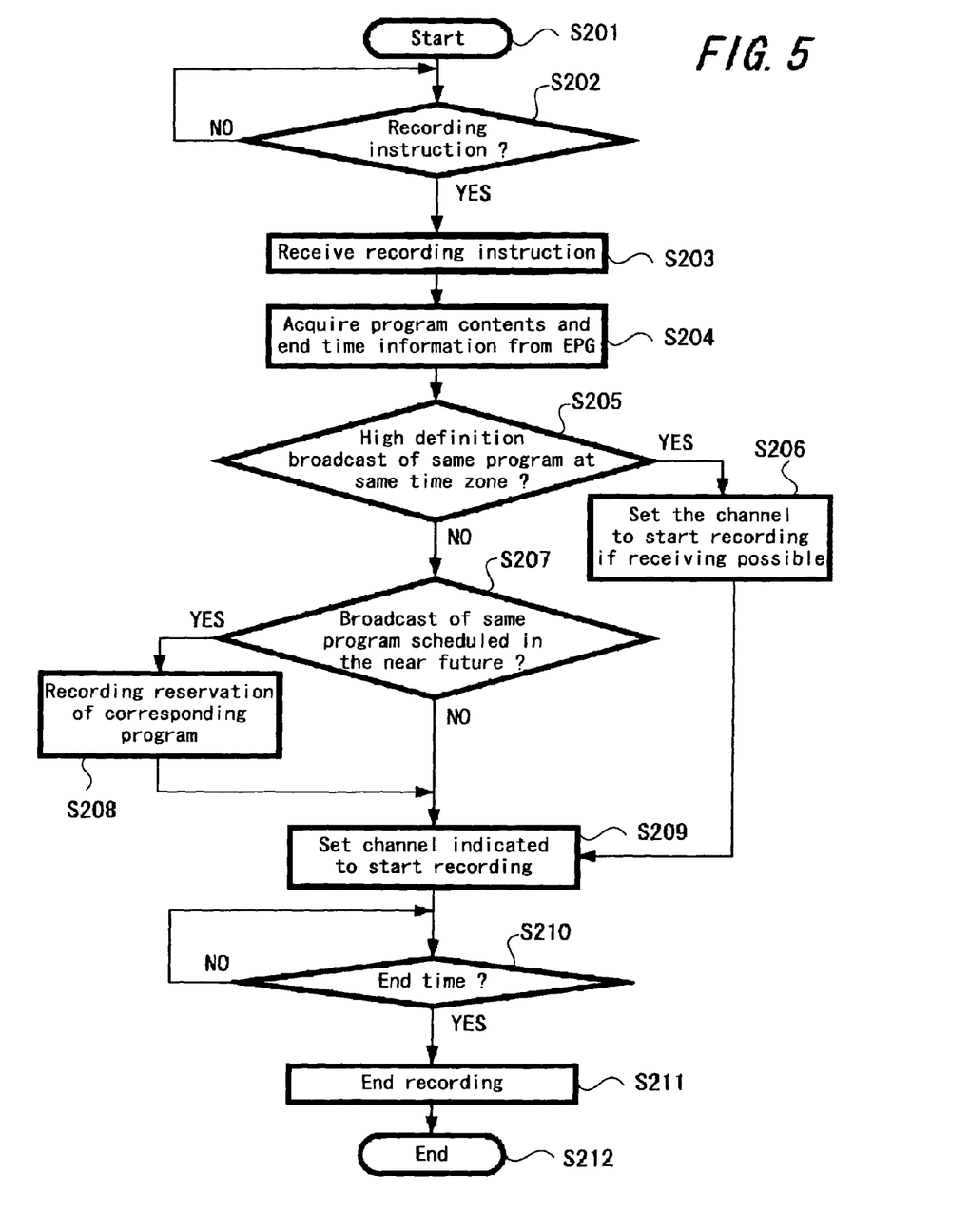
FIG. 5 is a flowchart showing the operation of a recording and reproducing apparatus according to an embodiment of the present invention.

Next, the recording processing operation of the recording and reproducing apparatus 4 is explained with reference to FIG. 5. First, the recording processing operation is started in the recording and reproducing apparatus 4 (step S201). Whether or not program viewing information from the mobile phone unit 1 is received by the network receiving unit 41, in other words, whether or not the program recording instruction is issued from the mobile phone unit 1 is monitored (step S202), and when the recording instruction has been issued, the recording instruction data within the program viewing information is received (step S203).

Then, after receiving the program viewing information, the recording and reproducing apparatus 4 acquires from the EPG data received via the network, based on the given channel information, contents and information on the end time of the broadcasting of the program indicated by the recording instruction (step S204). The recording and reproducing apparatus 4 can automatically end the recording when the time information of the clock unit 47 coincides with this information on the end time of the broadcasting.

At this time, based on the EPG data it is judged whether the program of the same contents as in the channel indicated by the recording instruction is broadcasted in the high quality broadcast such as high-definition television broadcast in the same time zone (step S205), and if there is the high quality broadcast in the same time zone and if the recording and reproducing apparatus 4 can receive the high quality broadcast, the channel of the high quality broadcast is set instead of the channel indicated by the mobile phone unit 1, and the recording operation of higher television picture quality is started (step S206).

Further, in the case where the recording of a certain program was for example indicated on a weekday but the program will be broadcasted again on a weekend, it is judged based on the EPG data whether the program of the same contents as in the channel indicated by the mobile phone unit 1 is scheduled to be broadcasted in the near future (step S207), and when the broadcast is scheduled in the near future, the corresponding channel is set in the recording and reproducing unit 45 and the recording of the program is reserved (step S208). On the contrary, when the broadcast is not scheduled in the near future, the program of the channel indicated by the mobile phone unit 1 is set in the recording and reproducing unit 45 and the recording is started (step S209). Further, if the high quality broadcast of the same contents as the program indicated is scheduled to be broadcasted later on, it is preferable to record the high quality broadcast in the processing at step S208.

Then, after the recording is started at step S206 or step S209, it is judged whether the broadcast program has reached to the recording end time by comparing the end time data on the relevant broadcast program acquired from the EPG data with the time data in the clock unit 47 (step 210). The recording operation is ended when having reached to the end time of the recording (step 211), and if there is an instruction from the user, reproduction of the recorded program can be performed (step 212).

When the recording reservation of the same program in the near future is made at step 209, the recording from the start time of the program can be executed.

Figure 6:
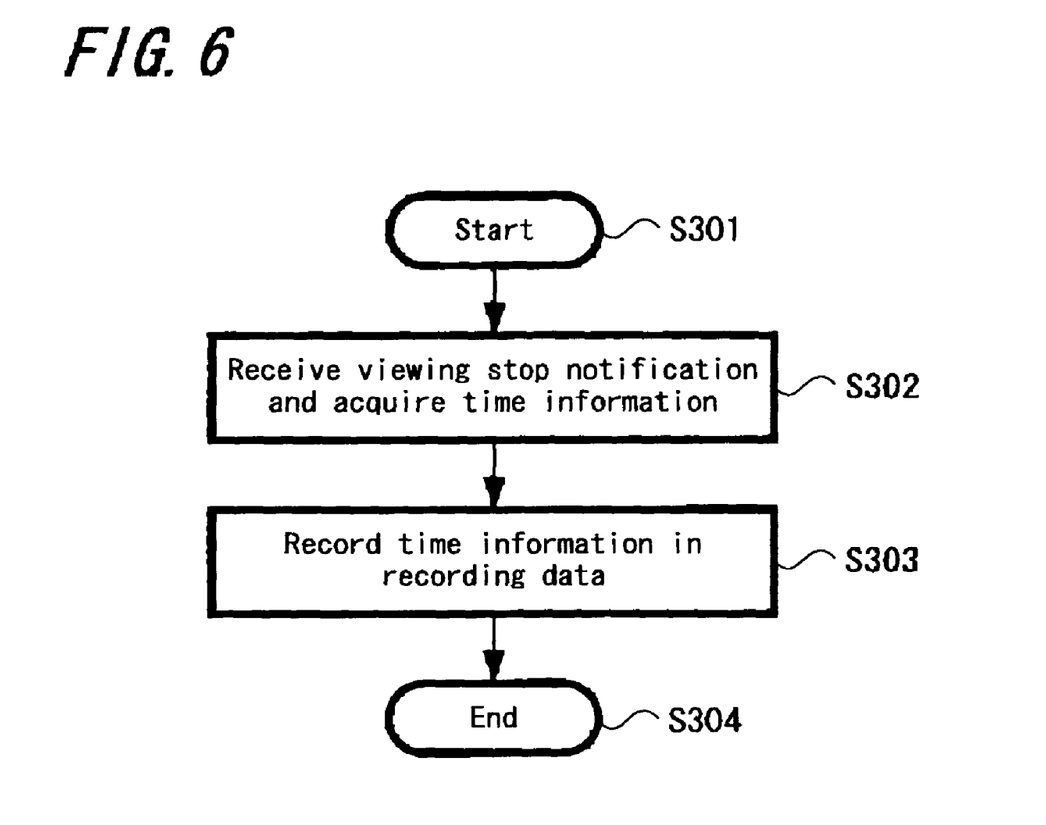
FIG. 6 is a flowchart showing the processing of the case in which a notification of suspending the viewing is received according to an embodiment of the present invention.

FIG. 6 is a flowchart showing the processing in the case where the recording and reproducing apparatus 4 receives from the mobile phone unit 1 a notification of suspending the viewing. The controller 43 of the recording and reproducing apparatus 4 receives a viewing stop notification and the flowchart starts (step S301). When the viewing stop notification from the mobile phone unit 1 is received in the middle of the program, time information at that time is acquired from the clock unit 47 (step S302) and is recorded in the data under recording as additional information (step S303) to end the processing (step S304). The time information regarding the time when the viewing stop notification is received is used at the time when reproduction is performed later on. Instead of acquiring the time information when the viewing stop notification was received from the clock unit 41, the time when the viewing was stopped in the mobile phone unit 1 may be acquired from the clock unit 17 to be added to the viewing stop notification.

Figure 7:
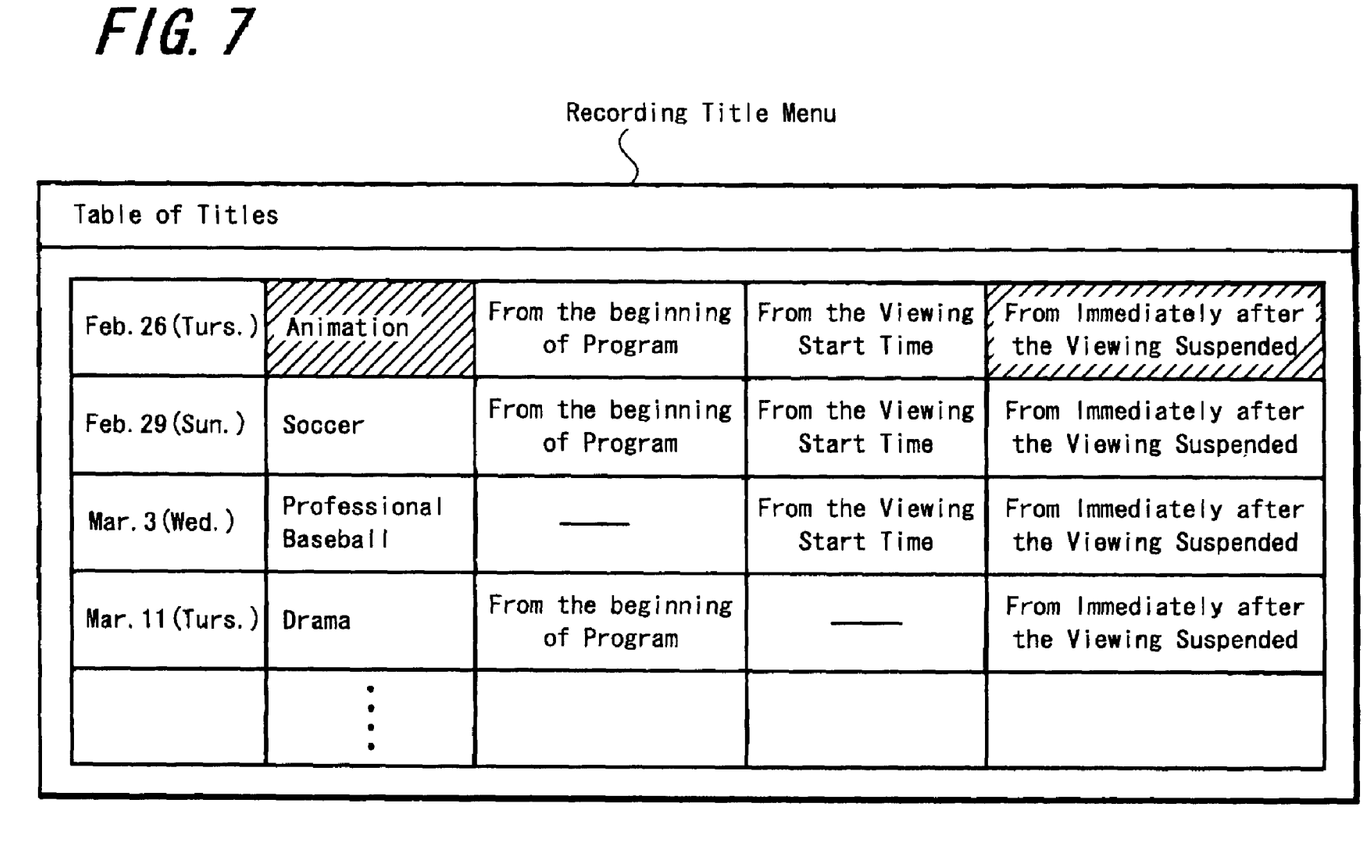
FIG. 7 is a diagram showing a recording title menu according to an embodiment of the present invention.

FIG. 7 shows an example of a recording title menu. The reproducing operation of the program recorded in the recording and reproducing apparatus 4 is briefly explained with reference to FIG. 7. The user performs the reproducing operation of the recording and reproducing apparatus 4 through a remote commander receiving unit 46, and the setting screen is displayed on the television monitor apparatus 5, where "reproduction of title recorded" button (not illustrated) is selected to display the recording title menu as shown in FIG. 7.

For example, each "title" of four recorded television programs and respective "recording time and day" and "possible reproduction start position of recorded program" are displayed in the recording title menu shown in FIG. 7. Needless to say, items to be displayed are not limited to those in this example. A user operates a remote commander to make a cursor on the recording title menu move and selects the desired title, for example, the animation (the shaded portion). Next, since the user is asked to select the reproduction "from the beginning of the program", "from the viewing start time" or "from immediately after the viewing was suspended", a desired reproduction start position is selected. In this example, "from immediately after the viewing is suspended" (the shaded portion) is selected, so that the reproduction starts from the time when the viewing stop notification recorded at step S303 of FIG. 6 in the recording data to be sent to the recording and reproducing unit 45 is received from the mobile phone unit 1. The program reproduced at this time has the same contents as the program which was viewed away from home; however, there may be a case in which the high quality broadcast (high definition broadcast) was recorded.

Further, if the viewing "from the beginning of the program" is selected, the user can view the program from the head portion of the recorded broadcast, that is, from the start time of the program. In addition, in the case where the same program as that indicated to record is not scheduled to broadcast in the near future, viewing "from the beginning of the program" cannot be selected as shown in the section of the recorded title "Professional baseball"

Furthermore, if the program was recorded from the beginning thereof, the user can start the reproduction from the point of time when the viewing was started away from home, if desired. This operation can be performed at step S104 shown in FIG. 4, in which the time information on the time when the recording and reproducing apparatus 4 receives the recording instruction sent from the mobile phone unit 1 after the start of viewing is acquired from the clock unit 47 to be recorded and is recorded in the data under recording as the additional information.

If the viewing of a program using the mobile phone unit 1 was stopped in the middle of the program away from home, the head search operation is performed based on viewing stop time information added to the recorded data to resume the continuous viewing of the program immediately after the suspension of viewing. Further, if the recording reservation was made at the broadcast start time of another time zone different from the broadcast time zone of the program indicated to record, the program can be viewed from the start of the program broadcasting even if away from home the program was viewed from the middle thereof. Furthermore, the program viewed away from home can be reproduced immediately at home by executing the head search operation of the viewing start time based on the viewing start time information added to the recorded data, and the program can be reproduced immediately from the point of time where the viewing is started, even if the recording was performed later on from the start of program broadcasting, for example.

Moreover, settings of the recording processing operation in the recording and the reproducing apparatus 4 can also be changed such that the recording is started immediately after viewing the program using the mobile phone unit is suspended in the middle of the program. Specifically, the recording instruction is not issued at step S104 of a flowchart shown in FIG. 4, and the recording instruction of step S202 of a flowchart shown in FIG. 5 is received in the recording and reproducing apparatus 4 by notifying the recording and reproducing apparatus 4 of the suspension of viewing the program from the mobile phone unit 1 at step S107.

With the above configuration, the recording instruction to start recording of the program from the time when the user stopped viewing in the middle thereof can be sent to the recording and reproducing apparatus 4. In the case where the processing subsequent to step S203 in this example is the same as the above described example, the program indicated to be recorded can be recorded from the beginning thereof if the same program is scheduled to broadcast in the near future in step S207.

Further, in the above described embodiment, an example in which a program received by the mobile phone unit 1 is obtained from the television broadcast or the cable television network was explained; however, a program may be digital contents for example obtained from the Broadcast Satellite, Communication Satellite, Internet via the wireless LAN, and the like.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A mobile program recording system comprising a remote recording and reproducing apparatus and a mobile communication terminal, wherein:

the mobile communication terminal comprises:
　a television receiving unit which receives a television program;
　an audio and visual unit for viewing the television program received by said television receiving unit on a display;
　a first controller which generates a recording instruction signal that includes at least channel information of the television program and that gives an instruction to record the television program; and
　a transmitting unit which transmits said recording instruction signal from said first controller when viewing on said mobile communication terminal is suspended; and the remote recording and reproducing apparatus comprises:
　a clock unit;
　a first receiving unit which receives said recording instruction signal transmitted from the mobile communication terminal;
　a second receiving unit which receives an electronic program guide;
　a recording and reproducing unit which records and reproduces a television program on receipt of said recording instruction signal from said first controller by said receiving unit; and
　a second controller which starts said recording and reproducing unit to record the television program in accordance with said recording instruction signal received by said first receiving unit, wherein when a user fails to input a recording command for recording the television program to the first controller within a predetermined time period after starting viewing the television program on the display, the first controller automatically generates the recording instruction signal for recording the television program and the transmitting unit transmits the recording instruction signal to the remote recording and reproducing apparatus, wherein the second controller acquires an end time of the television program from the received electronic program guide according to the channel information included in the recording instruction signal, and the second controller stops recording the television program by the recording and reproducing unit when an end of the television program is determined to be reached according to a time of the clock unit and the acquired end time, and wherein the mobile communication terminal is capable of communicating with the remote recording and reproducing apparatus through a network.

2. The program recording system according to claim 1, wherein when said second controller acquires a title of the television program from the received electronic program guide according to the channel information included in the recording instruction signal, and when the second controller finds a second program having the same title in a high definition channel as that of the television program, the second controller controls the recording and reproducing unit to record the second program in the high definition channel.

3. The program recording system according to claim 1, wherein when said second controller in said recording and reproducing apparatus judges from said received electronic program guide that of the program of a same title as the television program of the channel information included in said recording instruction signal is further scheduled to start after the time indicated by the recording instruction, recording reservation of said program of the same title is performed.

4. The program recording system according to claim 1, wherein when said television program is viewed using said mobile communication terminal and then the viewing is suspended while said recording and reproducing apparatus is recording said television program, said first controller in said mobile communication terminal generates a viewing stop signal; and said transmitting unit transmits said viewing stop signal; and said receiving unit receives said viewing stop signal from said mobile communication terminal; and said second controller records the time when said viewing stop signal is received.

5. A mobile program recording system comprising a remote recording and reproducing apparatus and a mobile communication terminal, wherein:

the mobile communication terminal comprises:
a television receiving unit which receives a television program;
an audio and visual unit for viewing the television program received by said television receiving unit;
a first controller which generates a recording instruction signal that includes at least channel information of the television program and that gives an instruction to record the television program; and
a transmitting unit which transmits said recording instruction signal from said first controller; and the remote recording and reproducing apparatus comprises:
a clock unit;
a first receiving unit which receives said recording instruction signal transmitted from the mobile communication terminal;
a second receiving unit which receives an electronic program guide;
a recording and reproducing unit which records and reproduces a television program on receipt of said recording instruction signal from said first controller by said receiving unit; and
a second controller which starts said recording and reproducing unit to record the television program in accordance with said recording instruction signal received by said first receiving unit, wherein said mobile communication terminal further comprises a notification unit and an input unit, said first controller inquires using said notification unit whether the program being viewed is recorded or not, and when the input to record said program being viewed is performed by said input unit, said recording instruction signal is generated, wherein when a user fails to input a recording command for recording the television program to the first controller within a predetermined time period after starting viewing the television program on a display, the first controller automatically generates the recording instruction signal for recording the television program and the transmitting unit transmits the recording instruction signal to the remote recording and reproducing apparatus, wherein the second controller acquires an end time of the television program from the received electronic program guide according to the channel information included in the recording instruction signal, and the second controller stops recording the television program by the recording and reproducing unit when an end of the television program is determined to be reached according to a time of the clock unit and the acquired end time, and wherein the mobile communication terminal is capable of communicating with the remote recording and reproducing apparatus through a network.

6. The program recording system according to claim 5, wherein when said television program is viewed using said mobile communication terminal and then the viewing is suspended while said recording and reproducing apparatus is recording said television program, said first controller in said mobile communication terminal generates the viewing stop signal;

said transmitting unit transmits said viewing stop signal;

said receiving unit in said recording and reproducing apparatus receives said viewing stop signal from said mobile communication terminal; and said second controller records the time when said viewing stop signal is received.

7. A mobile program recording system comprising a remote recording and reproducing apparatus and a mobile communication terminal, wherein:

the mobile communication terminal comprises:
a television receiving unit which receives a television program;
an audio and visual unit for viewing the television program received by said television receiving unit;
a first controller which generates a recording instruction signal that includes at least channel information of the television program and that gives an instruction to record the television program; and
a transmitting unit which transmits said recording instruction signal from said first controller; and the remote recording and reproducing apparatus comprises:
a clock unit;
a first receiving unit which receives said recording instruction signal transmitted from the mobile communication terminal;
a second receiving unit which receives an electronic program guide;

a recording and reproducing unit which records and reproduces a television program on receipt of said recording instruction signal from said first controller by said receiving unit; and a second controller which starts said recording and reproducing unit to record the television program in accordance with said recording instruction signal received by said first receiving unit, wherein said mobile communication terminal further comprises a first clock unit and said first controller generates said recording instruction signal when detecting by said first clock unit that a predetermined period of time has passed after the start of viewing the television broadcast, wherein when a user fails to input a recording command for recording the television program to the first controller within a predetermined time period after starting viewing the television program on a display, the first controller automatically generates the recording instruction signal for recording the television program and the transmitting unit transmits the recording instruction signal to the remote recording and reproducing apparatus, wherein the second controller acquires an end time of the television program from the received electronic program guide according to the channel information included in the recording instruction signal, and the second controller stops recording the television program by the recording and reproducing unit when an end of the television program is determined to be reached according to a time of the clock unit and the acquired end time, and wherein the mobile communication terminal is capable of communicating with the remote recording and reproducing apparatus through a network.

8. The program recording system according to claim 7, wherein when said television program is viewed using said mobile communication terminal and then the viewing is suspended while said recording and reproducing apparatus is recording said television program, said first controller in said mobile communication terminal generates the viewing stop signal;

said transmitting unit transmits said viewing stop signal;

said receiving unit in said recording and reproducing apparatus receives said viewing stop signal from said mobile communication terminal; and said second controller records the time when said viewing stop signal is received.

9. A mobile communication terminal, comprising:

a television receiving unit which receives a television program;

an audio and visual unit for viewing the television program received by said television receiving unit on a display;

a first controller which generates a recording instruction signal that includes at least channel information of the television program and that gives an instruction to record the television program;

and a transmitting unit which transmits said recording instruction signal from said first controller to a remote recording and reproducing apparatus comprising a receiving unit when viewing on said mobile communication terminal is suspended, wherein when a user fails to input a recording command for recording the television program to the first controller within a predetermined time period after starting viewing the television program on the display, the first controller automatically generates the recording instruction signal for recording the television program and the transmitting unit transmits the recording instruction signal to the remote recording and reproducing apparatus, wherein the remote recording an reproducing apparatus acquires an end time of the television program from a received electronic program guide according to the channel information included in the recording instruction signal, and the remote recording and reproducing apparatus stops recording the television program when an end of the television program is determined to be reached according to a time of a clock unit and the acquired end time, and wherein the mobile communication terminal is capable of communicating with the remote recording and reproducing apparatus through a network.

10. The mobile communication terminal according to claim 9, wherein when said television program is being viewed and then the viewing of the television program is suspended, said first controller generates the viewing stop signal and said transmitting unit transmits said viewing stop signal.

11. A mobile communication terminal, comprising: a television receiving unit which receives a television broadcast program;

an audio and visual unit for viewing the television program received by said television receiving unit on a display;

a first controller which generates a recording instruction signal that includes at least channel information of the television program and that gives an instruction to record the television program;

a transmitting unit which transmits said recording instruction signal from said first controller to a remote recording and reproducing apparatus comprising a receiving unit; a notification unit; and an input unit, wherein said first controller inquires using said notification unit whether said program being viewed is recorded or not and when the input to record said program being viewed is performed by said input unit, said recording instruction signal is generated, wherein when a user fails to input a recording command for recording the television program to the first controller within a predetermined time period after starting viewing the television program on the display, the first controller automatically generates the recording instruction signal for recording the television program and the transmitting unit transmits the recording instruction signal to the remote recording and reproducing apparatus, wherein the remote recording and reproducing apparatus acquires an end time of the television program from a received electronic program guide according to the channel information included in the recording instruction signal, and the remote recording and reproducing apparatus stops recording the television program when an end of the television program is determined to be reached according to a time of a clock unit and the acquired end time, and wherein when a user fails to input a recording command to the first controller after a start of viewing the television broadcast program, the first controller automatically generates the recording instruction signal for recording the television broadcast program after the television program is viewed through the audio and visual unit for a predetermined period, and wherein the mobile communication terminal is capable of communicating with the remote recording and reproducing apparatus through a network.

12. The mobile communication terminal according to claim 11, wherein when said television program is being viewed and then the viewing of the television program is suspended, said first controller generates the viewing stop signal and said transmitting unit transmits said viewing stop signal.

13. A mobile communication terminal, comprising: a television receiving unit which receives a television program;
an audio and visual unit for viewing the television program received by said television receiving unit on a display;
a first controller which generates a recording instruction signal that includes at least channel information of the television program and that gives an instruction to record the television program;
a transmitting unit which transmits said recording instruction signal from said first controller to a remote recording and reproducing apparatus comprising a receiving unit; and a first clock unit,
wherein said first controller generates said recording instruction signal when detecting by said first clock unit that a predetermined period of time has passed after a start of viewing the television broadcast,
wherein when a user fails to input a recording command for recording the television program to the first controller within a predetermined time period after starting viewing the television program on the display,
the first controller automatically generates the recording instruction signal for recording the television program and the transmitting unit transmits the recording instruction signal to the remote recording and reproducing apparatus,
wherein the remote recording and reproducing apparatus acquires an end time of the television program from the received electronic program guide according to the channel information included in the recording instruction signal,
and the remote recording and reproducing apparatus stops recording the television program by the recording and reproducing unit when an end of the television program is determined to be reached according to a time of a second clock unit and the acquired end time,
and wherein when a user fails to input a recording command to the first controller after a start of viewing the television broadcast program, the first controller automatically generates the recording instruction signal for recording the television broadcast program after the television program is viewed through the audio and visual unit for a predetermined period, and wherein the mobile communication terminal is capable of communicating with the remote recording and reproducing apparatus through a network.

14. The mobile communication terminal according to claim 13, wherein when said television program is being viewed and then the viewing of the television program is suspended, said first controller generates the viewing stop signal and said transmitting unit transmits said viewing stop signal.

15. A remote recording and reproducing apparatus, comprising:
a clock unit;
a first receiving unit which receives a recording instruction signal from a mobile communication terminal that includes at least channel information of a television program and that gives an instruction to record the television program;
a second receiving unit which receives an electronic program guide; a recording and reproducing unit which records and reproduces the television program;
and a second controller which starts said recording and reproducing unit to record the television program in accordance with said recording instruction signal received by said first receiving unit when a viewing action on said mobile communication terminal is suspended,
wherein when a user fails to input a recording command for recording the television program to a first controller within a predetermined time period after starting viewing the television program on a display, the first controller automatically generates the recording instruction signal for recording the television program and the transmitting unit transmits the recording instruction signal to the remote recording and reproducing apparatus,
wherein the second controller acquires an end time of the television program from the received electronic program guide according to the channel information included in the recording instruction signal,
and the second controller stops recording the television program by the recording and reproducing unit when an end of the television program is determined to be reached according to a time of the clock unit and the acquired end time,
and wherein the mobile communication terminal is capable of communicating with the remote recording and reproducing apparatus through a network.

16. The recording and reproducing apparatus according to claim 15, wherein when said second controller acquires a title of the television program from the received electronic program guide according to the channel information included in the recording instruction signal, and when the second controller finds a second program having the same title in a high definition channel as that of the television program, the second controller controls the recording and reproducing unit to record the second program in the high definition channel.

17. The recording and reproducing apparatus according to claim 15,
wherein a viewing stop signal transmitted when suspending the viewing of a television program using a mobile communication terminal capable of viewing the television program is received and said second controller records the time when said viewing stop signal is received.

* * * * *